(12) United States Patent
Nakasha

(10) Patent No.: US 8,723,716 B2
(45) Date of Patent: May 13, 2014

(54) COMMUNICATION DEVICE AND IMAGING APPARATUS

(75) Inventor: Yasuhiro Nakasha, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 294 days.

(21) Appl. No.: 13/043,593

(22) Filed: Mar. 9, 2011

(65) Prior Publication Data
US 2011/0234443 A1 Sep. 29, 2011

(30) Foreign Application Priority Data
Mar. 23, 2010 (JP) .................................. 2010-65650

(51) Int. Cl.
*G01S 13/00* (2006.01)

(52) U.S. Cl.
USPC .............. 342/21; 342/22; 342/175; 342/192; 342/193; 342/194

(58) Field of Classification Search
USPC .............................. 342/21, 22, 175, 192–194
See application file for complete search history.

(56) References Cited

U.S. PATENT DOCUMENTS

| | | | | |
|---|---|---|---|---|
| 4,217,585 A | * | 8/1980 | Fishbein et al. | 342/160 |
| 4,364,048 A | * | 12/1982 | Waters et al. | 342/162 |
| 4,504,833 A | * | 3/1985 | Fowler et al. | 342/22 |
| 4,717,916 A | * | 1/1988 | Adams et al. | 342/107 |
| 4,926,443 A | * | 5/1990 | Reich | 375/349 |
| 5,073,782 A | * | 12/1991 | Huguenin et al. | 342/179 |
| 5,227,800 A | * | 7/1993 | Huguenin et al. | 342/179 |
| 5,455,590 A | * | 10/1995 | Collins et al. | 342/179 |
| 5,557,283 A | * | 9/1996 | Sheen et al. | 342/179 |
| 5,592,131 A | * | 1/1997 | Labreche et al. | 332/103 |
| RE35,607 E | * | 9/1997 | Nagamune et al. | 702/158 |
| 5,859,609 A | * | 1/1999 | Sheen et al. | 342/179 |
| 6,359,582 B1 | * | 3/2002 | MacAleese et al. | 342/22 |

(Continued)

FOREIGN PATENT DOCUMENTS

| | | |
|---|---|---|
| JP | 08-274637 | 10/1996 |
| JP | 11-311669 A | 11/1999 |

(Continued)

OTHER PUBLICATIONS

David M. Sheen, et al., "Three-Dimensional Millimeter-Wave Imaging for Concealed Weapon Detection", IEEE Transactions on Microwave Theory and Techniques, vol. 49, No. 9, Sep. 2001, pp. 1581-1592.

(Continued)

*Primary Examiner* — Peter Bythrow
(74) *Attorney, Agent, or Firm* — Fujitsu Patent Center

(57) ABSTRACT

A communication device includes an oscillator to generate an oscillation signal; a harmonic generator to generate a higher harmonic wave from the oscillation signal; a first filter to take out a first high frequency signal; a second filter to take out a second high frequency signal; a down conversion mixer to use the second high frequency signal to perform down conversion of a signal obtained by receiving a reflected signal of the first high frequency signal; a hybrid coupler to generate a first intermediate frequency signal and a second intermediate frequency signal, which are orthogonal with each other; a first mixer to take out a first baseband signal by mixing an output from the down conversion mixer with the first intermediate frequency signal; and a second mixer to take out a second baseband signal by mixing an output from the down conversion mixer with the first intermediate frequency signal.

15 Claims, 16 Drawing Sheets

(56) References Cited

U.S. PATENT DOCUMENTS

| | | | |
|---|---|---|---|
| 6,611,224 B1* | 8/2003 | Nysen et al. | 342/42 |
| 6,777,684 B1* | 8/2004 | Volkov et al. | 250/341.1 |
| 6,972,709 B1* | 12/2005 | Deem et al. | 342/70 |
| 7,002,511 B1* | 2/2006 | Ammar et al. | 342/134 |
| 7,019,682 B1* | 3/2006 | Louberg et al. | 342/22 |
| 7,034,746 B1* | 4/2006 | McMakin et al. | 342/179 |
| 7,167,123 B2* | 1/2007 | Hausner et al. | 342/22 |
| 7,295,146 B2* | 11/2007 | McMakin et al. | 342/22 |
| 7,304,603 B2* | 12/2007 | Reed et al. | 342/188 |
| 7,324,039 B2* | 1/2008 | Boltovets et al. | 342/70 |
| 7,450,052 B2* | 11/2008 | Hausner et al. | 342/22 |
| 7,460,055 B2* | 12/2008 | Nishijima et al. | 342/70 |
| 7,550,969 B2* | 6/2009 | Zhdanov | 324/243 |
| 7,609,199 B2* | 10/2009 | Nishijima et al. | 342/175 |
| 7,773,205 B2* | 8/2010 | Cooper et al. | 356/5.15 |
| 7,844,081 B2* | 11/2010 | McMakin et al. | 382/115 |
| 7,864,105 B2* | 1/2011 | Matsumoto | 342/127 |
| 2002/0130804 A1* | 9/2002 | McMakin et al. | 342/22 |
| 2003/0193430 A1* | 10/2003 | Gresham et al. | 342/70 |
| 2006/0066469 A1* | 3/2006 | Foote et al. | 342/22 |
| 2006/0132350 A1* | 6/2006 | Boltovets et al. | 342/70 |
| 2006/0273255 A1* | 12/2006 | Volkov et al. | 250/336.1 |
| 2007/0285307 A1* | 12/2007 | Nishijima et al. | 342/200 |
| 2009/0009384 A1* | 1/2009 | Kawano et al. | 342/135 |
| 2009/0065696 A1* | 3/2009 | Mann et al. | 250/339.06 |
| 2009/0073029 A1* | 3/2009 | Nishijima et al. | 342/200 |
| 2011/0291889 A1* | 12/2011 | Mayo | 342/372 |
| 2012/0200453 A1* | 8/2012 | Brosche | 342/175 |

FOREIGN PATENT DOCUMENTS

| | | |
|---|---|---|
| JP | 2001-501304 A | 1/2001 |
| JP | 2006-203718 A | 8/2006 |
| JP | 2007-28670 | 2/2007 |
| JP | 2009-526988 A | 7/2009 |
| WO | WO-98/11453 | 3/1998 |
| WO | WO-2007/093814 | 8/2007 |

OTHER PUBLICATIONS

Japanese Office Action mailed Nov. 19, 2013 for corresponding Japanese Application No. 2010-065650, with English-language translation.

* cited by examiner

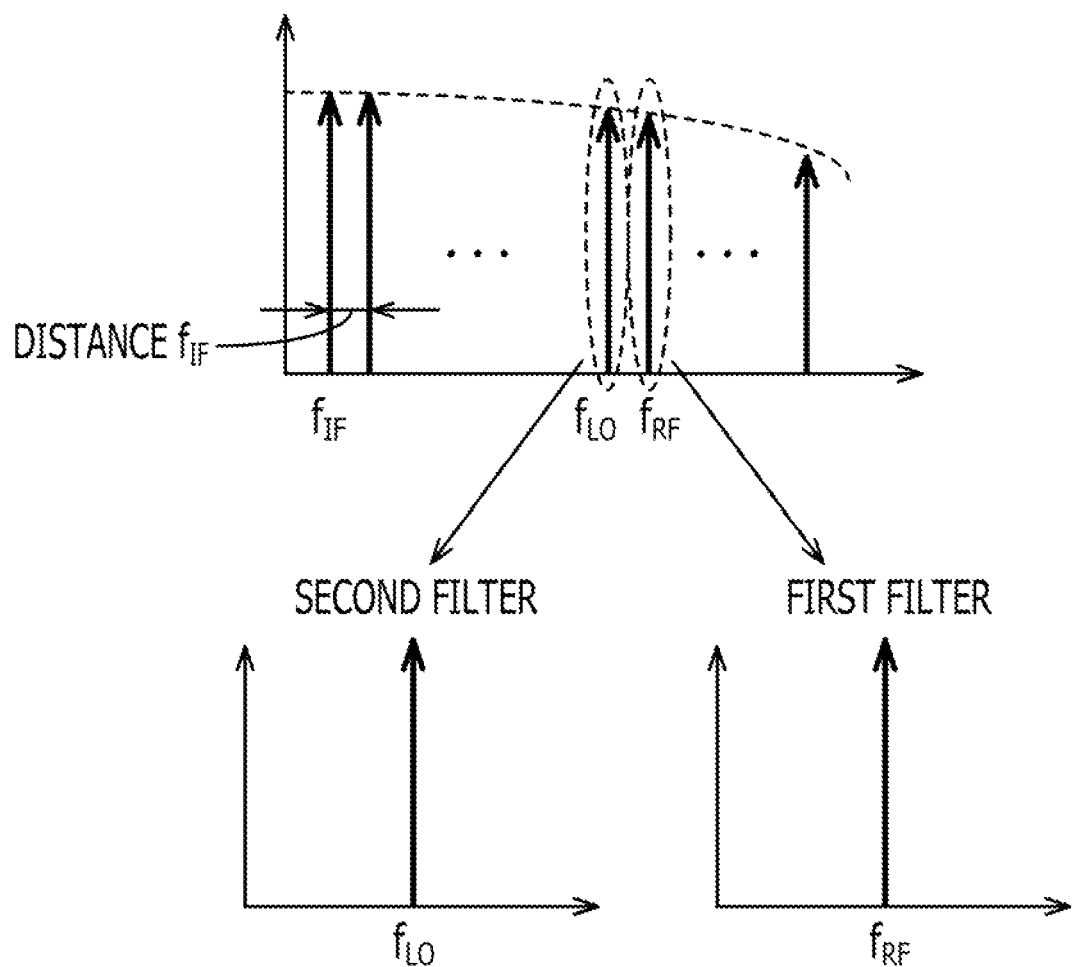

COMMUNICATION DEVICE AND IMAGING APPARATUS

CROSS-REFERENCE TO RELATED APPLICATION

This application is based upon and claims the benefit of priority of the prior Japanese Patent Application No. 2010-65650, filed on Mar. 23, 2010, the entire contents of which are incorporated herein by reference.

FIELD

The present invention relates to a communication device and an imaging apparatus.

BACKGROUND

An imaging apparatus with an image sensor using microwaves, millimeter waves, and terahertz waves is able to perform non-contact detection of a dangerous object or the like without causing harmful radiation exposure, differing from a visible optical sensor or an infrared sensor. For this reason, the imaging apparatus has been put into practical use in security checks at airports, event sites, and so on. The imaging apparatus using electric waves can detect a dangerous object, an unidentified object hidden under clothing or the like or an unidentified object behind a wall. In recent years, therefore, the imaging apparatus has been also used for non-contact size measurement in boutiques or the like.

Such an imaging apparatus has been called as a millimeter wave holographic system. The millimeter wave holographic system includes a plurality of communication devices arranged in a one-dimensional array (linear). The communication device includes, for example, transmitter, receiver or transmitter/receiver. Each communication device irradiates a millimeter wave to a target while performing a frequency sweep and then determines the intensity and phase of a reflection wave reflecting from the target for every sweep frequency. In the case of the one-dimensional array of transmission and receiving apparatuses, the measurement is performed by scanning the array in a vertical or horizontal direction and changing the spatial positions of the respective transmission apparatuses.

The reflectance f of the target at (x, y, z) can be represented by the following equation (1):

$$f(x, y, z) = FT_{3D}^{-1}\left\{FT_{2D}\{s(x, y, w)\}e^{-j\sqrt{4k^2 - k_x^2 - k_y^2}\, z_1}\right\} \quad (1)$$

Here, $FT_{2D}(x)$ represents a two-dimensional Fourier transform function on the scanning plane. $FT_{3D}^{-1}(x)$ represents a three-dimensional inverse Fourier transform function. In addition, $s(x, y, \omega)$ represents a received power at a sweep (angle) frequency $\omega$ at a scanning position $(x, y)$ and k represents a space wave number vector: $2K^2 = K_x^2 + K_y^2 + K_z^2$. In this holographic system, the relationship between a sweep frequency step $\Delta f$ and a distance Rmax from the holographic system to the target can be represented by $\Delta f < c/R_{max}$. Furthermore, c represents an electric wave propagation rate of a space medium. Therefore, the smaller the sweep frequency step $\Delta f$ is, the more the ability to detect a substance in the distance can be increased. On the other hand, the detection power of this system is represented by the target in-plane direction $\delta x \approx \lambda c F\#/2$ and the distance direction $\delta x \approx c/2B$.

Here, F# is a ratio of the distance R between the target and the communication device to the scanning length of the communication device. $\lambda c$ represents the wavelength of an electric wave and B represents the frequency bandwidth. In other words, the longer the scanning length is and the wider the frequency bandwidth is, the more the detection resolution increases.

Preferably, the communication device of the imaging apparatus may include two different high-frequency signals, a high-frequency signal (RF signal) to be used as a transmission signal and a local frequency signal (LO signal) to be used for down conversion of the received signal, which is the reflected signal of the RF signal. Thus, the traditional communication device has been designed to include two oscillators, a RF oscillator that generates a RF signal and a LO oscillator that generates a LO signal. Therefore, there is a disadvantage in that decreases in positional accuracy and detecting accuracy occur due to the phase noise of the signal source. The phase noise of the oscillator tends to be deteriorated in proportion to increase in frequency. Particularly, when the frequency being used is a millimeter wave or a sub-terahertz wave of higher than 90 GHz, such a disadvantage becomes remarkable. Accordingly, it is preferable to reduce the noise of the signal source because of the above reasons.

Here, the examples of the related art include those disclosed in Japanese Laid-open Patent Publication No. 11-311669, Japanese Laid-open Patent Publication No. 2006-203718, Japanese National Publication of International Patent Publication No. 2001-501304, Japanese National Publication of International Patent Publication No. 2009-526988, U.S. Pat. No. 5,455,590, U.S. Pat. No. 5,557,283, and D. Sheen, D. McMakin and T. E. Hall, "Three-Dimensional Millimeter-Wave Imaging for Concealed Weapon Detection" IEEE Trans. MTT, vol. 49, no. 9, pp. 1581-1592, 2001.

SUMMARY

According to an aspect of the embodiment, a communication device includes an oscillator configured to generate an oscillation signal; a harmonic generator configured to generate a higher harmonic wave from the oscillation signal; a first filter configured to take out a first high frequency signal from said higher harmonic wave; a second filter configured to take out a second high frequency signal from the higher harmonic wave; a down conversion mixer configured to use the second high frequency signal to perform down conversion of a reception signal obtained by receiving a reflected signal of the first high frequency signal being transmitted; a hybrid coupler configured to generate a first intermediate frequency signal and a second intermediate frequency signal, which are orthogonal with each other, from the oscillation signal; a first mixer for taking out a first baseband signal by mixing an output from the down conversion mixer with the first intermediate frequency signal; and a second mixer configured to take out a second baseband signal by mixing an output from the down conversion mixer with the first intermediate frequency signal.

According to the another aspect of the embodiment, an imaging apparatus includes an image sensor that includes a plurality of communication devices being arranged in an array, where each of the plurality of communication devices transmits a high frequency signal to a target and each of the plurality of communication devices receives the high frequency signal reflected on the target to give a reception signal; an A/D converter for converting the reception signal into a digital signal; and an image processing device for generating a reflected image of the high frequency signal on the target from an output from the AD converter, wherein each of the plurality of communication devices includes an oscillator for generating an oscillation signal, a harmonic generator for generating a higher harmonic wave from the oscillation signal, a first filter for taking out the high frequency signal from the higher harmonic wave, a second filter for taking out a local high frequency signal of a frequency different from the high frequency signal from the higher harmonic wave, a down conversion mixer for using the low high frequency signal to perform down conversion of the reception signal, a hybrid coupler for generating a first intermediate frequency signal and a second intermediate frequency signal, which are orthogonal with each other, from the oscillation signal, a first mixer for taking out a first baseband signal by mixing an output from the down conversion mixer with the first intermediate frequency signal, and a second mixer for taking out a second baseband signal by mixing an output from the down conversion mixer with the second intermediate frequency signal.

The object and advantages of the invention will be realized and attained at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of harmonic signals generated from the short pulse generator and an example of processing for extracting a signal from the harmonic signals through the first and second filters;

DESCRIPTION OF EMBODIMENTS

Figure 1:
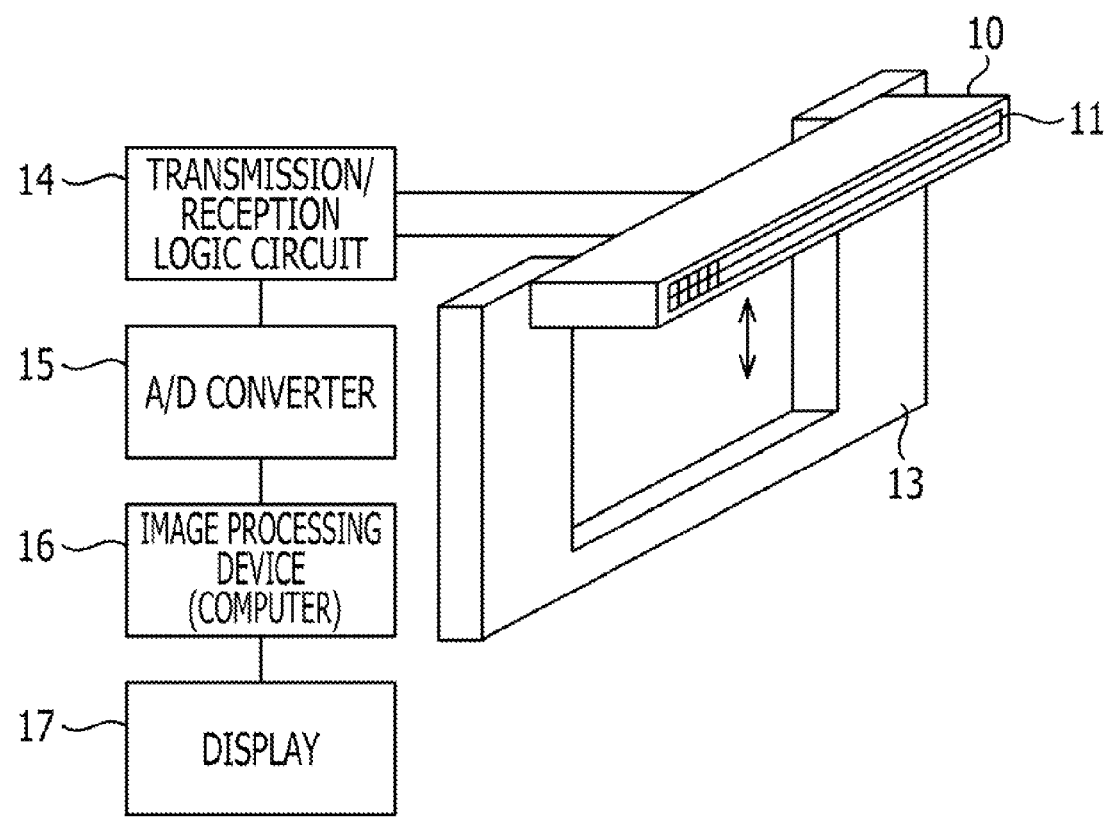
FIG. 1 is a diagram illustrating an example of an imaging apparatus according to a first embodiment.

FIG. 1 is a diagram illustrating an example of an imaging apparatus according to a first embodiment. The imaging apparatus of the first embodiment includes a communication device array 10, a scanning mechanism 13, a communication logic circuit 14, an A/D converter 15, an image processing device 16, and a display 17.

The communication device array 10 includes a plurality of communication devices 11 arranged in a one-dimensional array (linear). Each communication device 11 emits a high frequency signal ahead (in the direction perpendicular to the array) and then receives the high frequency signal reflected from a target located anteriorly.

The scanning mechanism 13 moves along the communication device array 10 up and down. In the first embodiment 1, the communication array 10 includes a plurality of communication devices 11 linearly arranged in the horizontal direction. The scanning mechanism 13 moves the communication array 10 in the vertical direction to generate a two-dimensional image of the target. Alternatively, the communication array 10 may be arranged in the vertical direction and may be provided with a scanning mechanism 13 which can move in the horizontal direction to generate the two dimensional image of the target. The communication array 10 is arranged in the vertical direction, while the scanning mechanism 13 may be designed to allow the communication device array 10 to go around the target to yield a 360-degree image of the target.

The communication logic circuit 14 controls the communication device array 10 to sweep the frequency of a high frequency signal to be output, while reading an output signal from the communication logic array 10. For example, the communication device circuit 14 controls the communication device array 10 to change the frequency of a transmission signal from 90 GHz to 91 GHz in steps of 100 MHz and repeat such changes.

The A/D converter 15 changes the output signal read from the communication device array 10 through the communication logic circuit 14 to a digital signal. The image processing device 16 generates the image signal of the target from the digital signal output from the A/D converter 15 and then displays the image signal on the display 17. The image processing device 16 may be realized by, for example, a computer and computer software.

The communication logic circuit 14, the A/D converter 15, the image processing device 16, and the display 17 are well known in the art, so that their further descriptions will be omitted.

Figure 2:
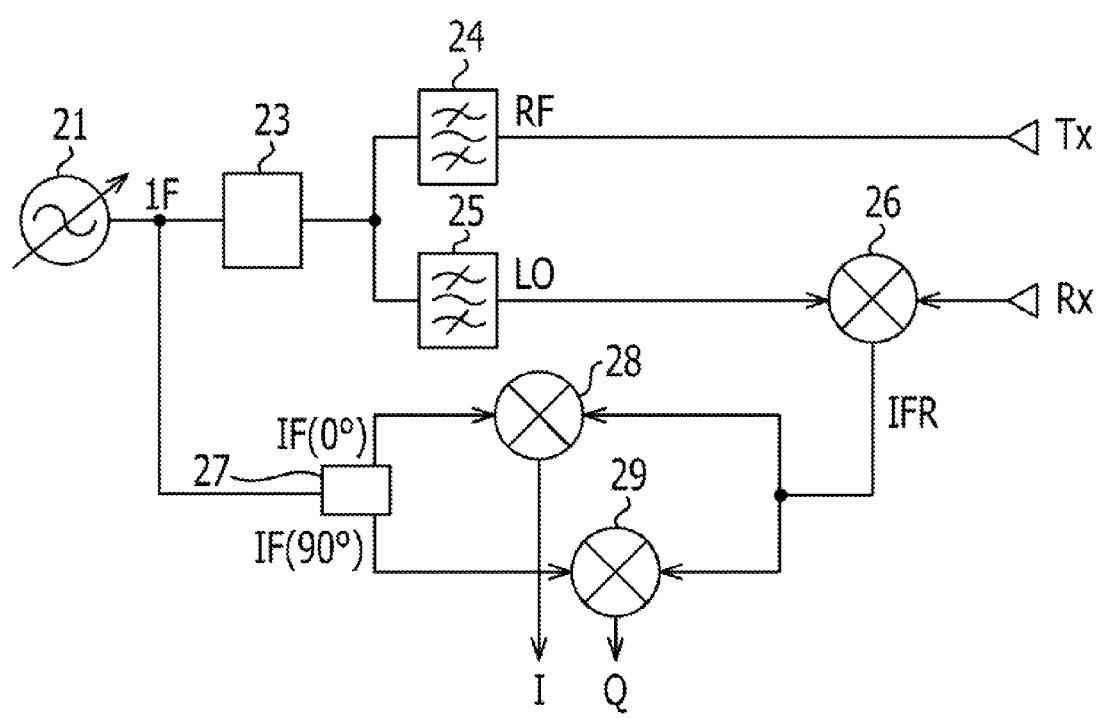
FIG. 2 is a diagram illustrating an example of each communication device according to the first embodiment.

FIG. 2 is a diagram illustrating an example of each communication device 11 according to the first embodiment.

The communication device 11 of the first embodiment includes an oscillator 21, a harmonic generator 23, a first filter 24, a second filter 25, a down conversion mixer 26, a hybrid coupler 27, a first mixer 28, and a second mixer 29.

The oscillator 21 may be, for example, a frequency variable oscillator to generate an oscillation signal IF of an intermediate frequency. The oscillator 21 repeats the sweeping operation to change the frequency of the oscillation signal IF in the specified frequency range with specified operations under the controls of the communication logic circuit 14.

The harmonic generator 23 generates the harmonic signals of the IF signal containing a first high frequency signal RF and a second high frequency signal (local frequency signal) LO from the oscillation signal IF.

For example, the first filter 24 may be a narrow band pass filter that allows passage of a signal within a specified frequency range including the frequency of the first high frequency signal RF. The first filter 24 can take out the first high frequency signal RF from a higher harmonic wave output from the harmonic generator 23.

For example, the second filter 25 may be a narrow band pass filter that allows passage of a signal within a specified frequency range including the frequency of the second high frequency signal (local frequency signal). The second filter 25 outputs a second high frequency signal (local frequency signal) from the harmonic signal output from the harmonic generator 23.

For example, if a number that multiplies the frequency of the first high frequency signal RF with respect to the oscillation signal IF is set to "n" (n is an integer), then the number that multiplies the frequency of the second high frequency signal (local frequency signal) LO with respect to the oscillation signal IF is preferably set to "n±1".

The first high frequency signal RF output from the first filter 24 is output as a transmission signal Tx to the target. The transmission signal Tx is reflected from the target and then received as a reception signal Rx. Then, the received signal Rx is input to the down conversion mixer 26. On the other hand, the second high frequency signal (local frequency signal) LO is input to the down conversion mixer 26. The down conversion mixer 26 performs down conversion of the reception signal Rx, which is substantially the same frequency as that of the first high frequency signal RF. The down conversion mixer 26 also performs down conversion of the second high frequency signal (local frequency signal) LO. The number for multiplying the frequency of the first high frequency signal RF is "n" (n is an integer) and the number for multiplying the second high frequency signal (local frequency signal) LO is "n±1". Therefore, the frequency of the down conversion signal IFR generated from the down conversion mixer 26 is substantially the same as the frequency of the oscillation signal IF.

The hybrid coupler 27 receives the oscillation signal IF and then generates a first intermediate signal IF (0 degree) and a second intermediate frequency signal IF (90 degrees) which are orthogonal to each other.

The first mixer 28 mixes a down conversion signal IFR output from the down conversion mixer 26 and the first intermediate frequency signal IF (0 degree) to take out a first baseband signal I.

The second mixer 29 mixes a down conversion signal IFR output from the down conversion mixer 26 and the second intermediate frequency signal (90 degrees) to take out a second baseband signal Q. From the first and second baseband signals I and Q, the phase information of the reception signal Rx can be detected. Thus, the presence of the target can be detected and the distance to the target can be also measured.

The first and second baseband signals I and Q generated as described above can be supplied to the A/D converter 15 through the communication logic circuit 14. Furthermore, the reflected image of the target is generated based on the aforementioned equation (1).

Next, an imaging apparatus according to a second embodiment will be described. The imaging device according to the second embodiment has substantially the same schematic configuration as that of the first embodiment shown in FIG. 1 with the exception that the configuration of each communication device 11 is more specifically designed.

Figure 3:
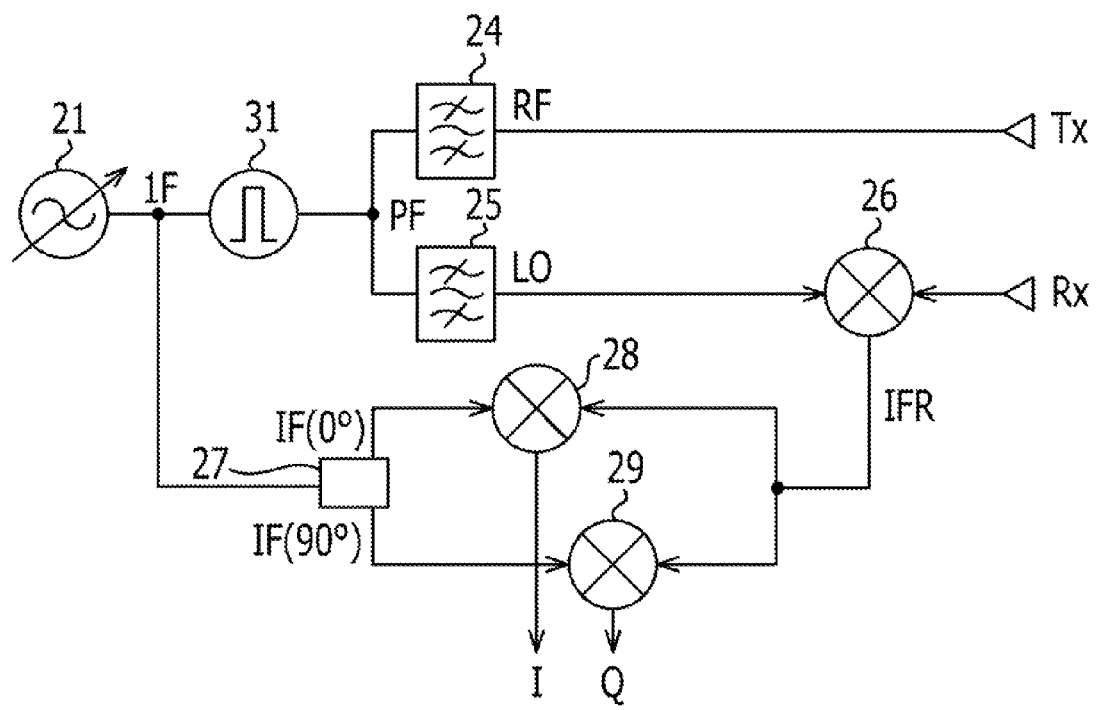
FIG. 3 is a diagram illustrating an example of a communication device according to a second embodiment.

FIG. 3 is a diagram illustrating an example of a communication device 11 according to the second embodiment.

The communication device 11 of the second embodiment includes an oscillator 21, a short pulse generator 31, a first filter 24, a second filter 25, a down conversion mixer 26, a hybrid coupler 27, a first mixer 28, and a second mixer 29.

For example, the oscillator 21 may be a frequency variable oscillator just as in the case with the first embodiment, generating an oscillation signal IF of an intermediate frequency. The oscillator 21 repeats the sweeping operation to change the frequency of the oscillation signal IF being generated in the specified frequency range with specified operations under the controls of the communication logic circuit 14.

The short pulses generator 31 generates the harmonic signals of the IF signal containing a first high frequency signal RF and a second high frequency signal (local frequency signal) LO from the oscillation signal IF. In other words, the short pulses generator 31 operates as harmonic generator 23.

Figure 4A:
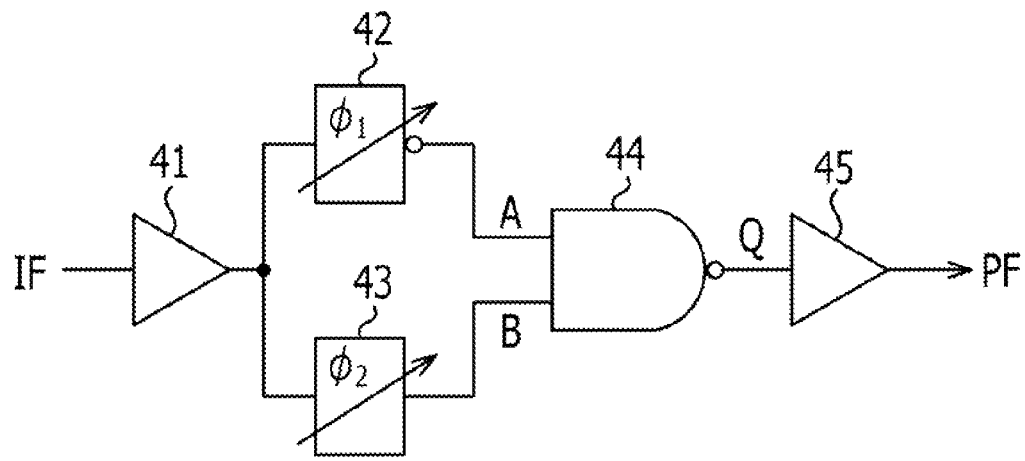
FIG. 4A and FIG. 4B are diagrams illustrating an example of the circuit of a short pulse generator and an example of the circuit of a core unit, one of the structural components of the short pulse generator.
Figure 4B:
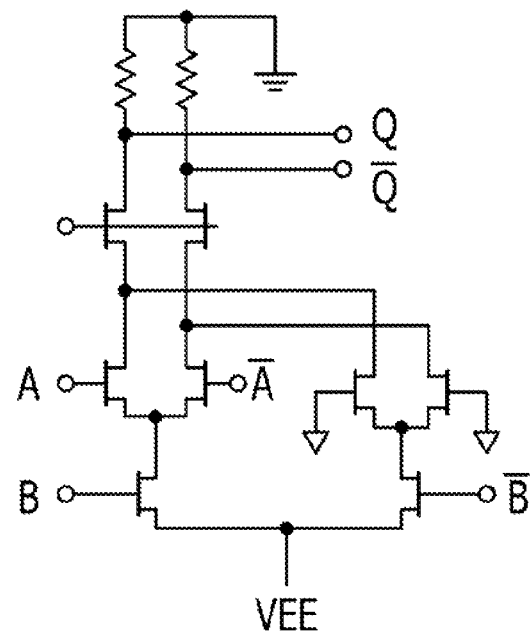

FIG. 4A is a diagram illustrating an example of the circuit of the short pulse generator 31. FIG. 4B is a diagram illustrating an example of the circuit of a core unit 44 which is an element of the circuit of the short pulse generator 31.

As shown in FIG. 4A, the short pulse generator 31 includes an input buffer 41 in which an oscillation signal IF is input, two variable delay circuits 42 and 43, a core unit 44, and an output buffer 45. Here, each of the variable delay circuits 42 and 43 delays the output from the buffer 41 and the amount of the delay is variable.

As shown in FIG. 4B, the core unit 44 is a NAND circuit to which the outputs A and B from two variable delay circuits 42 and 43 are input. The transistor is an InP-HEMT transistor with a gate length of about 75 nm.

Figure 5A:
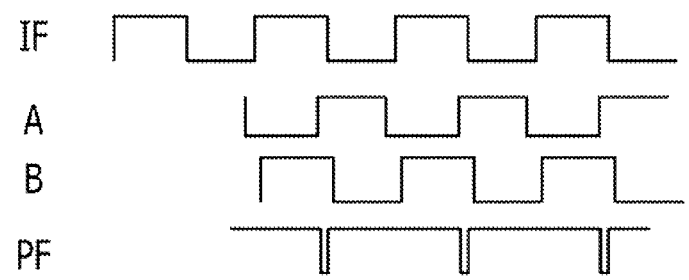
FIG. 5A and FIG. 5B are diagrams illustrating an example of a time chart representing the operation of the short-pulse generator and an example of an output pulse generated from the short-pulse generator.
Figure 5B:
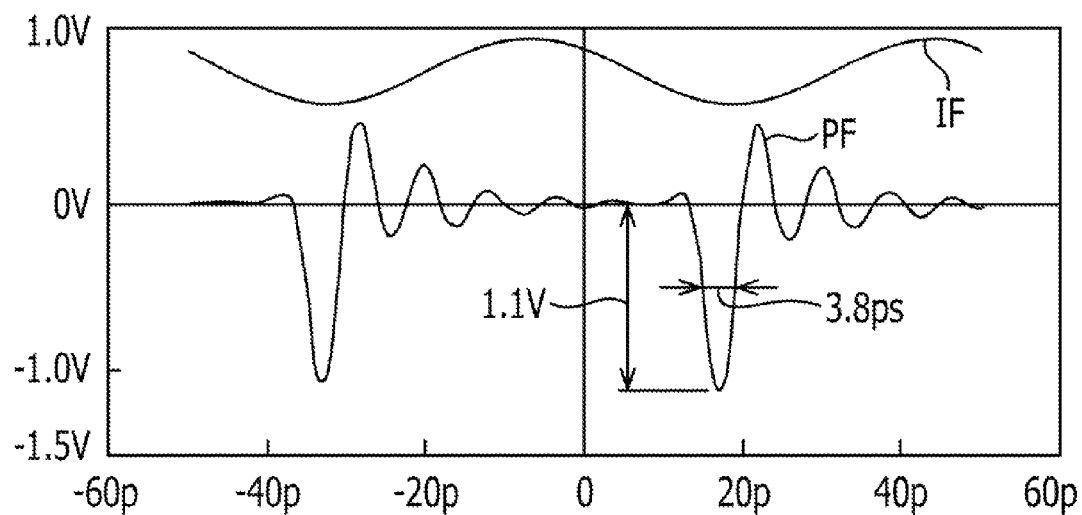

FIG. 5A is an example of a time chart representing the operation of the short pulse generator 31. The pulse width of the output pulse PF varies according to the delay amount of each of two variable delay circuits 42 and 43. FIG. 5B is a diagram illustrating an example of an output pulse PF generated upon input of a 20-GHz oscillation signal IF. As shown in FIG. 5B, the output pulse PF is a pulse string with a half bandwidth of 3.8 pico-seconds (ps) at a peak voltage of 1.1 V (−1.1 V because of negative polarity).

The output pulse PF generated from the short pulse generator 31 includes a signal component represented by the following equation (2) when decomposed into a spectrum by the Fourier transform, where $T_W$ denotes a pulse width.

$$F(\omega) = \frac{4\sin^2(\omega_{IF} T_w/2)}{T_w \omega_{IF}^2} \quad (2)$$

Here, $\omega_{IF}$ denotes an IF frequency. That is, the output pulse PF includes a flat spectrum with a plateau extending to a frequency equivalent to the inverse number of the pulse width $T_W$. Here, as shown in FIG. 4B, the short pulse generator 31 having a core unit with an InP-HEMT transistor is used for generation of a pulse string with a pulse width of 5 picoseconds (ps) by input of a 9-GHz IF signal. At this time, the pulse string includes a spectrum extending to 5 ps−1=200 GHz.

The first filter 24 and the second filter 25 can be realized by, for example, a coupling microstrip line formed on an alumina substrate of 2.7×2.8 mm in size and 100 μm in thickness.

Figure 6B:
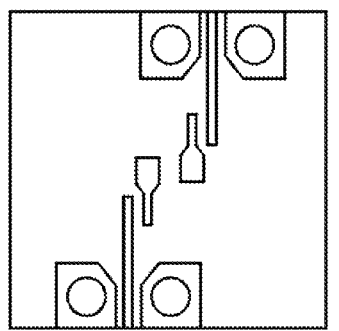
FIGS. 6A to 6D are diagrams illustrating examples of the circuit patterns of first and second filters and examples the characteristics thereof.
Figure 6A:
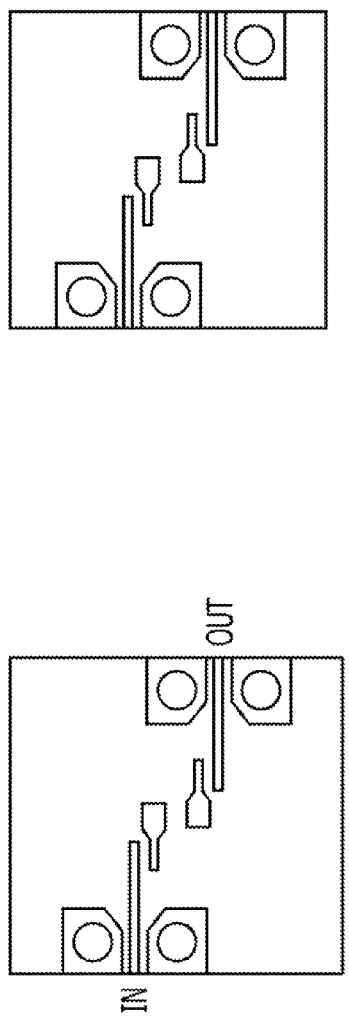
Figure 6D:
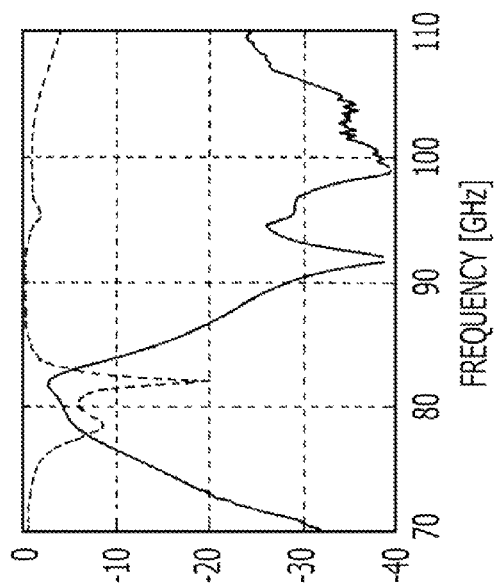
Figure 6C:
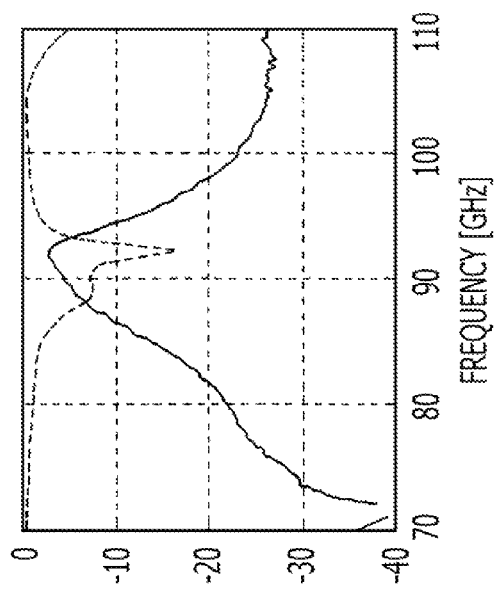

FIG. 6A illustrates the circuit pattern of the first filter 24 FIG. 6B illustrates the characteristics of the first filter 24, FIG. 6C illustrates the circuit pattern of the second filter 25, and the FIG. 6D illustrates the characteristics of the second filter 25. As shown in FIG. 6B, the first filter 24 allows the passage of a signal at a wavelength in the range of 90 to 91 GHz and decreases any signal out of the range. Similarly, as shown in FIG. 6C, the second filter 25 allows the passage of a signal at a wavelength in the range of 81 to 81.9 GHz and decreases any signal out of the range.

FIG. 7 is a diagram illustrating an example of harmonic signals generated from the short pulse generator 31 and an example of processing for extracting a signal from the harmonic signals through the first filter 24 and the second filter 25.

As shown in FIG. 7, the short pulse generator 31 generates a short pulse with a narrow pulse width. The short pulse includes a signal at a frequency obtained by multiplication of the frequency $f_{IF}$ of the oscillation signal IF. A signal at a frequency obtained by the ten-fold multiplication of the frequency $f_{IF}$, $10f_{IF}=f_{RF}$, corresponds to the first high frequency signal RF, and a signal at a frequency obtained by the nine-fold multiplication of the frequency $f_{IF}$, $9f_{IF}=f_{LO}$, corresponds to the second high frequency signal RF. The first high frequency signal RF can be taken out by passing through the first filter 24. The second high frequency signal (local frequency signal) LO can be taken out by passing through the second filter 25. As described above, the oscillator 21 performs the sweeping operation that changes the frequency of an oscillation signal IF being generated in the range of 9 GHz to 9.1 GHz with 10-MHz steps. Thus, the frequency of the first high frequency signal RF changes in the range of 90 GHz to 91 GHz and the frequency of the second high frequency signal (local frequency signal) LO changes in the range of 81 GHz to 81.9 GHz. Therefore, a 90-GHz band imaging apparatus can be realized, generating the reflected image of the target with a distance of about 30 m and a resolution of about 15 cm.

Figure 8:
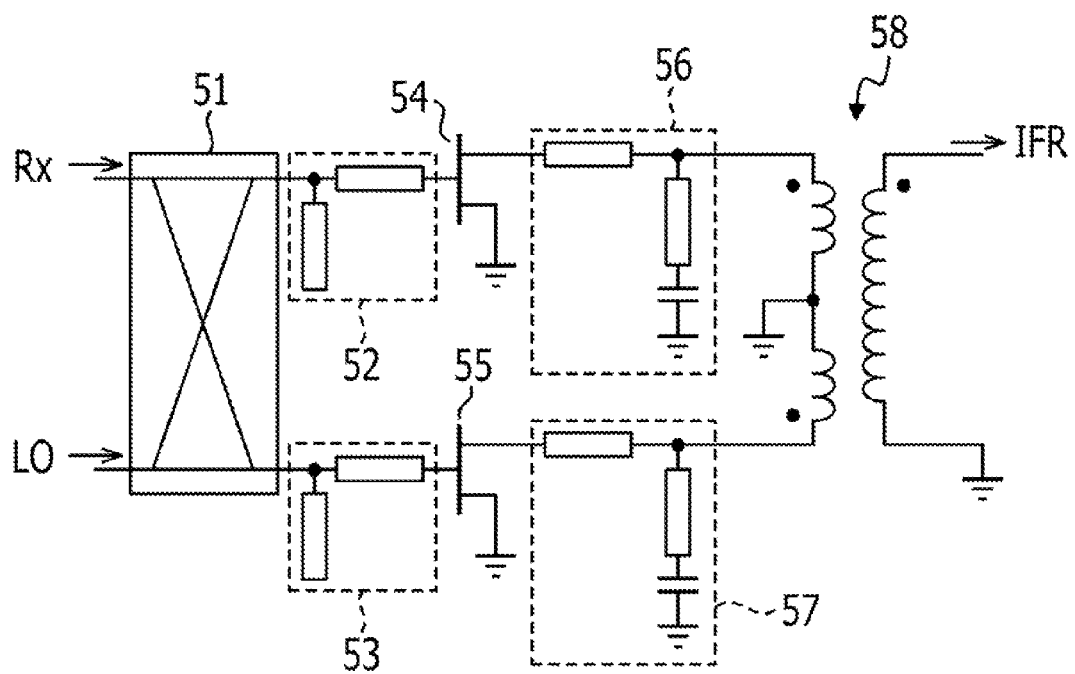
FIG. 8 is a diagram illustrating an example of the circuit of a down conversion mixer.

FIG. 8 is a diagram illustrating an example of the circuit of the down conversion mixer 26.

The down conversion mixer 26 includes a hybrid coupler 51, matching circuits 52, 53, 56, and 57, InP-HEMT transistors 54 and 55 that form driving circuits, and a converter 58 that converts a balance output into a signal output.

For example, the hybrid coupler 51 may be a 90-degree hybrid coupler. A reception signal Rx input into the transistor 55 is delayed 90 degrees compared with the input to the transistor 54. For the second high frequency signal (local frequency signal) LO, in contrast, the input to the transistor 54 is delayed 90 degrees compared with the input to the transistor 55. The phase angle of an output signal appeared as a result of the mixing is equal to the difference between the phase angle of the Rx signal and the phase angle of the LO signal. Therefore, there is a phase difference of 180 degrees between the output of the transistor 54 and the output of the transistor 55. If the output of the transistor 54 and the output of the transistor 55 are synthesized together in reverse phase using the converter 58, a resulting output can be taken out efficiently. In this embodiment, two output signals from the hybrid coupler 51 are impedance matched by the matching circuits 52 and 53 and then applied to the gates of the transistors 54 and 55, respectively. The outputs of the transistors 54 and 55 are impedance matched by the matching circuits 52 and 53 and then input to the primary side of the transformer in the converter 58. Therefore, when the differential component between the reception signal Rx and the second high frequency signal LO is in positive phase, an electric current corresponding to the differential component between the reception signal Rx and the second high frequency signal LO flows in one direction. In contrast, when it is in negative phase, an electric current corresponding to the differential component between the reception signal Rx and the second high frequency signal LO flows in reverse direction. As a result, a direct current voltage corresponding to the differential component between the reception signal Rx and the second high frequency signal LO is generated on the primary side of the transformer and then output as a down conversion signal IFR.

Figure 9:
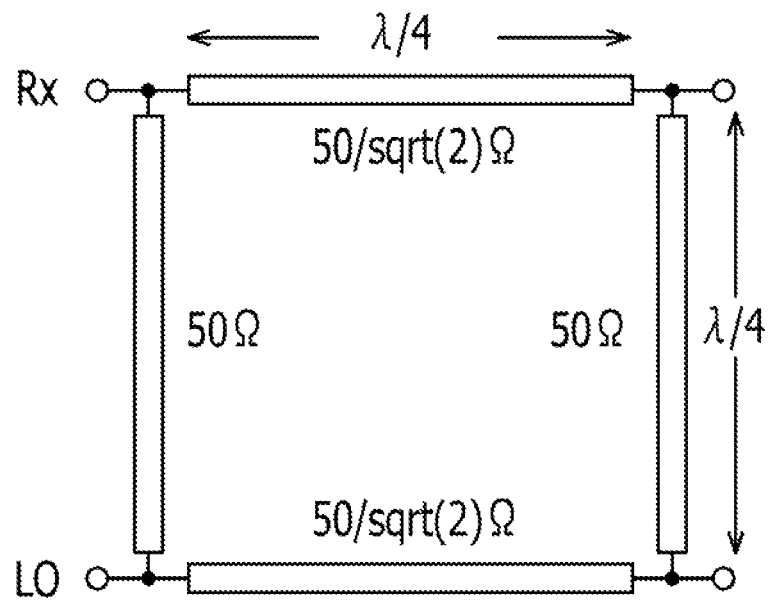
FIG. 9 is a diagram illustrating an example of the circuit of a hybrid coupler.

FIG. 9 is a diagram illustrating an example of the circuit of the hybrid coupler 51. The hybrid coupler 51 can be realized by connecting two 50-Ω lines of λ/4 in length and two 50×2$^{-1/2}$-Ω lines of λ/4 in length together as shown in the figure.

The hybrid coupler 27 receives the oscillation signal IF and then generates a first intermediate signal IF (0 degree) and a second intermediate frequency signal IF (90 degrees) which are orthogonal to each other. In FIG. 9, when the length of the line is set to one fourth (¼) of the wavelength of the oscillation signal IF, the RF terminal is set to an input for the oscillation signal IF, and the LO terminal is terminated with a resistance of 50Ω, the hybrid coupler 27 can be realized by taking the first intermediate signal IF (0 degree) out of one of the remaining two terminals and the second intermediate frequency signal IF (90 degrees) out of the other thereof.

The first mixer 28 and the second mixer 29 mix the down conversion signal IFR output from the down conversion mixer 26 with the first intermediate frequency signal IF (0 degree) and the first intermediate frequency signal IF (90 degrees) to take out a first baseband signal I and a second baseband signal Q, respectively.

Figure 10:
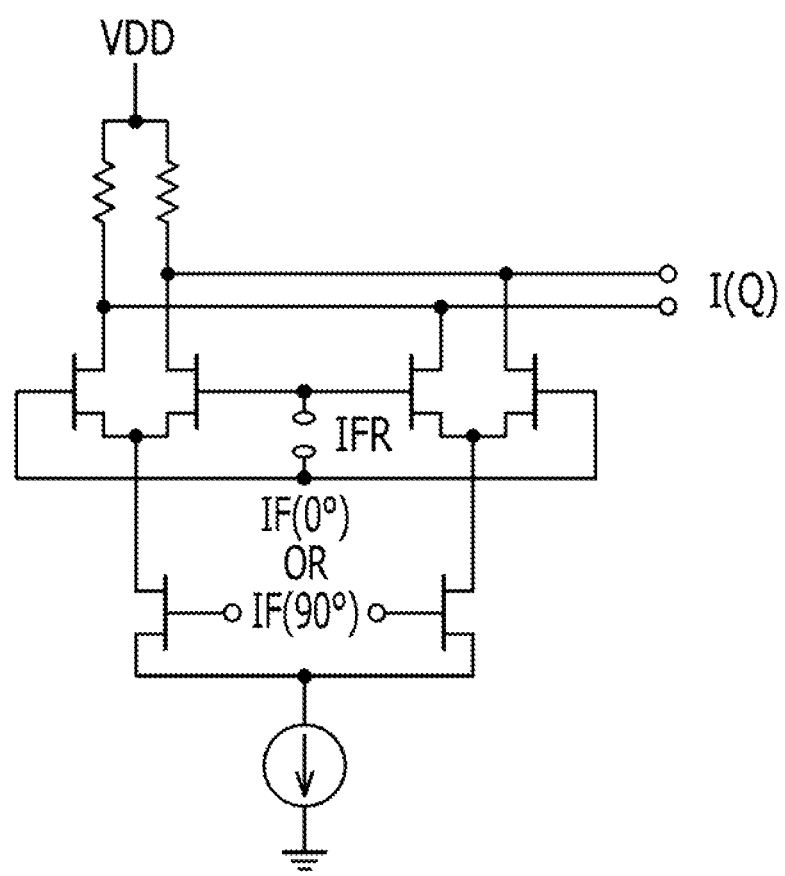
FIG. 10 is a diagram illustrating examples of first and second mixer circuits.

FIG. 10 is a diagram illustrating examples of the circuits of first and second mixers 28 and 29. As shown in FIG. 10, the first and second mixers 28 and 29 are double-balanced mixers, respectively. Each of the first and second mixers 28 and 29 generates a baseband signal having a frequency which is a difference between the frequency of the down conversion signal IFR and the frequency of the first intermediate frequency signal IF (0 degree) or the frequency of the second intermediate frequency signal IF (90 degrees) as a differential signal.

Figure 11:
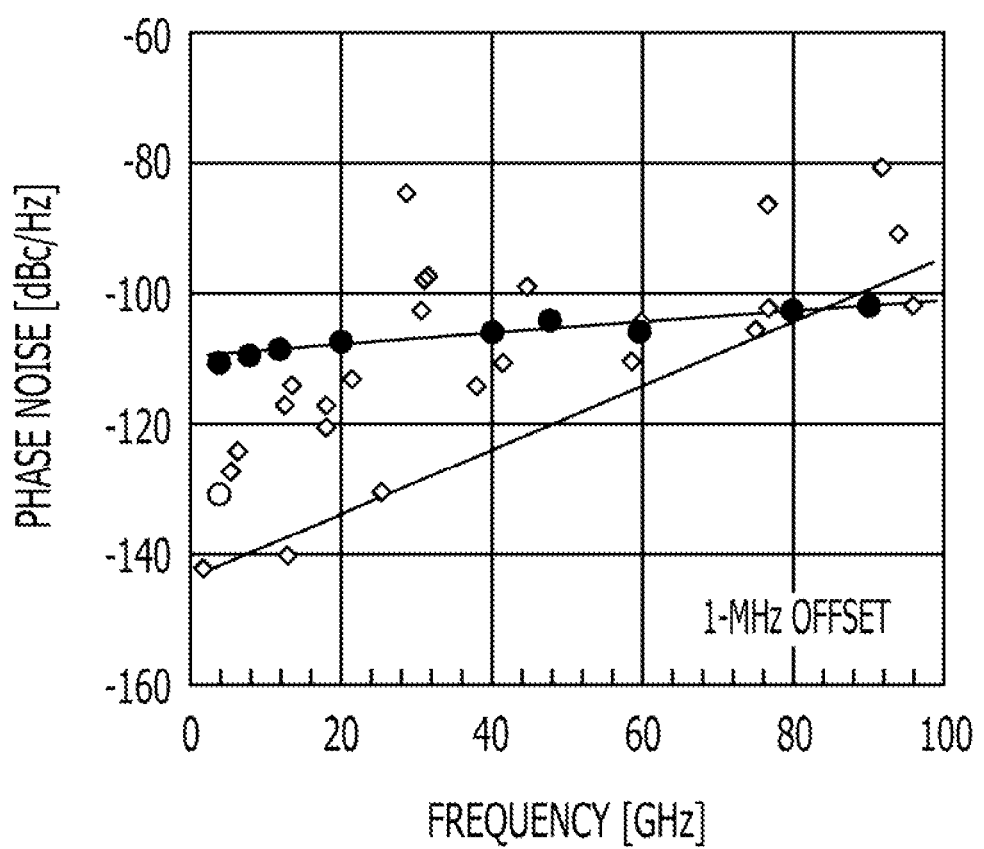
FIG. 11 is a diagram illustrating a comparison between the phase noise of a higher harmonic wave output from the short pulse generator according to the first embodiment and the phase noise of an oscillation signal output from a typical oscillator.

FIG. 11 is a graphic diagram illustrating a comparison between the phase noise of a higher harmonic wave output from the short pulse generator 31 in the first embodiment and the phase noise of an oscillation signal output from a typical oscillator. At a low frequency band, the phase noise of the higher harmonic wave output from the short pulse generator 31 is inferior to the phase noise of the oscillator. However, the relationship between them is reversed almost at a frequency of greater than 80 GHz. The phase noise of the higher harmonic wave from the short pulse generator 31 becomes lower than the phase noise of the oscillator. In general, the higher the oscillation frequency increases the more the oscillation signal power tends to decrease. The present device capability comes to the limit at a frequency of 80 GHz or more. Thus, because of an insufficient oscillation signal power obtained, a deterioration in phase noise may occur due to a decrease in relative ratio between the oscillation signal power and the noise power. On the other hand, the pulse generator is not an oscillator itself and is provided with a function of generating a higher harmonic wave. Thus, the phase noise of the higher harmonic wave has a small dependence on the frequency. Therefore, in the first embodiment, a decrease in noise power of each communication device is possible, so that the detection accuracy of image data can be increased.

Next, an imaging apparatus according to a third embodiment will be described.

Figure 12:
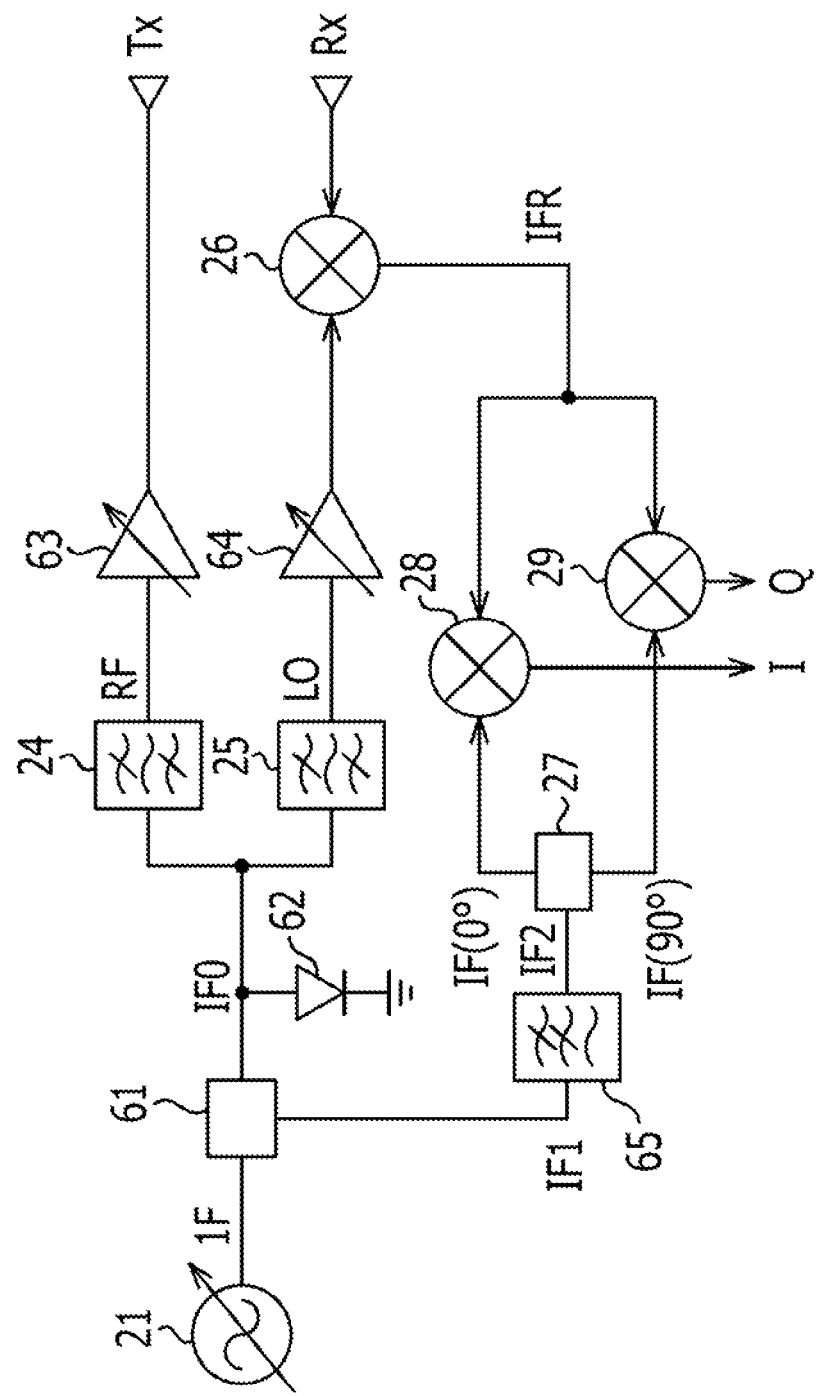
FIG. 12 is a diagram illustrating an example of a communication device according to a third embodiment.

FIG. 12 is a diagram illustrating an example of a communication device 11 used in the imaging apparatus of the third embodiment. The imaging apparatus of the third embodiment includes a substantially similar configuration as that of the second embodiment. In each communication device 11 of the imaging apparatus of the third embodiment, a higher harmonic wave is generated using a diode 62 instead of the short pulse generator and such a modification involves a further addition of an amplifying circuit or the like. Specifically, in the communication device 11 of the third embodiment, the diode 62 is mounted on the circuit of the second embodiment shown in FIG. 3 in replace of the short pulse generator 31. In addition, the communication device 11 of the third embodiment further includes a distributor 61, variable gain amplifiers 63 and 64, and a low-pass filter 65.

The distributor 61 distributes an oscillation signal IF output from the oscillator 21 to both an oscillation signal IFO and an oscillation signal IF1.

The diode 62 is connected between the output line of the distributor 61 and ground GND. The diode 62 is a nonlinear element and output current increases exponentially with input voltage as represented by the following equation (3):

$$i(v_{in})=I_0\exp(v_{in})\approx i_0+k_1 v_{in}^1+k_2 v_{in}^2+k_3 v_{in}^3 \ldots \quad (3)$$

Therefore, an n-fold wave (n is an integer) can be generated by an effect of n-power term when a sine wave is input as an oscillation signal IFO. In the third embodiment, for example, an InP-HEMT Schottky diode is used. Thus, an input of a 90-GHz oscillation signal IFO leads to an output of a higher harmonic wave extending at intervals of 9 GHz.

Figure 13A:
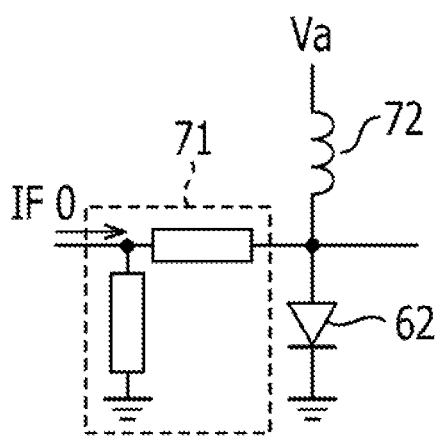
FIGS. 13A to 13C are diagrams illustrating an example of the circuit of a diode portion and an example of a modified circuit.

FIG. 13A is a diagram illustrating an example of the circuit around the diode 62. The diode 62 is coupled between an inductance element 72 connected to a power line of positive voltage Va and ground. An oscillation signal IFO is input to the coupling node between the diode 62 and the inductance element 72 through a matching circuit 71. The diode 62 superimposes a higher frequency wave on the oscillation signal IFO input into the coupling node between the diode 62 and the inductance element 72. The signal overlapped with the higher harmonic wave is input into each of the first and second filters 24 and 25.

Figure 13B:
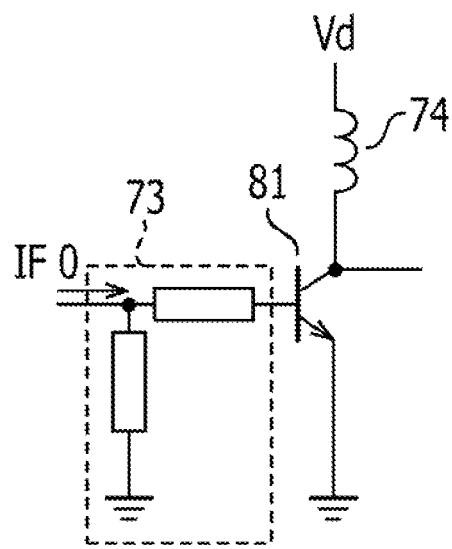

In the third embodiment, a higher harmonic wave is generated using the diode 62. Alternatively, instead of the diode 62, a bipolar transistor or a field effect transistor (FET) may be used. FIG. 13B is an exemplary circuit using a bipolar transistor 81. In this case, the bipolar transistor 81 is coupled between the inductance element 74 coupled to the power line of positive voltage Vd and ground. The oscillation signal IFO is input to the base of the bipolar transistor 81 through the matching circuit 73.

Figure 13C:
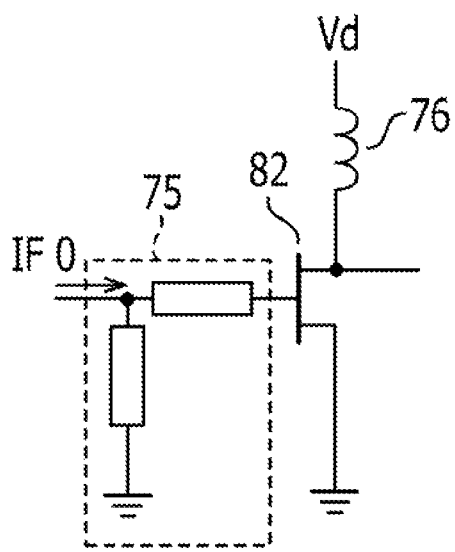

Furthermore, FIG. 13C illustrates an exemplary circuit using a FET bipolar transistor 82. In this case, the FET bipolar transistor 82 is coupled between the inductance element 76 coupled to the power line of positive voltage Vd and ground. The oscillation signal IFO is input to the gate of the FET bipolar transistor 82 through the matching circuit 75.

Referring back to FIG. 12, similar to the second embodiment, a first filter 24 that extracts a ten-fold wave and a second filer 25 that extracts a nine-fold wave are arranged on the downstream of the diode 62. Then, the ten-fold wave is defined as a first higher frequency signal RF and the nine-fold wave is defined as a second higher frequency signal (local frequency signal) LO. Then, a 90-GHz imaging apparatus can be realized. However, in the third embodiment, the diode is used as a harmonic generator. The higher the frequency increases, the more the spectrum energy of the higher harmonic wave can be decreased. Thus, variable gain amplifiers 63 and 64 for power-level adjustment are mounted on the downstreams of the first and second filters 24 and 25 to adjust signal levels, respectively.

Furthermore, a low-pass filter 65 is mounted on the input part of the hybrid coupler 27 to reduce an oscillation signal IF contaminated with the harmonic component of the diode 62 from entering into the hybrid coupler 27. Also, in the third embodiment, the oscillation signal IF is swept to 9 to 9.1 GHz with 10-MHz steps. Such a configuration of the 90-GHz band imaging apparatus can generate the reflected image of the target with a distance of about 30 m and a resolution of about 15 cm.

Figure 14:
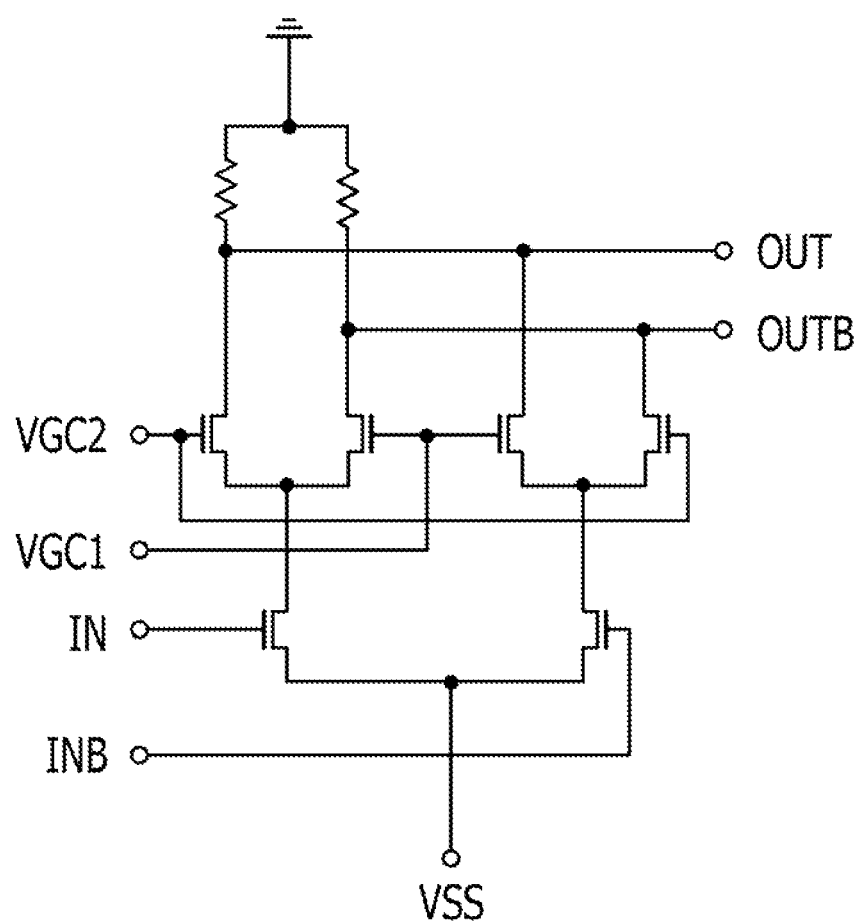
FIG. 14 is a diagram illustrating an example of a variable gain amplifier for power level adjustment used in the first embodiment.

FIG. 14 is a diagram illustrating examples of variable gain amplifiers 63 and 64 for power level adjustment used in the third embodiment. The variable gain amplifiers 63 and 64 for power level adjustment are differential amplifiers and amplify differential inputs IN and INB corresponding to the first high frequency signal RF and the second high frequency signal (local frequency signal) LO and then output the amplified signals to the differential outputs OUT and OUTB, respectively. Gain (amplification factor) can be adjusted with control signals VGC1 and VGC2.

Figure 15:
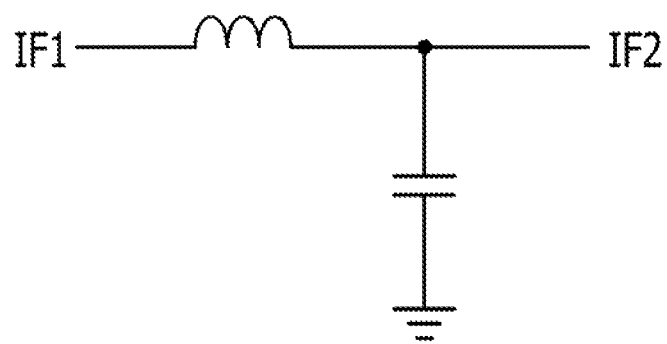
FIG. 15 is a diagram illustrating an example of the circuit of a low-pass filter.

FIG. 15 is a diagram illustrating an exemplary circuit of the low-pass filter 65. The low-pass filter 65 includes a well-known configuration using a resistor and a capacitor.

Figure 16:
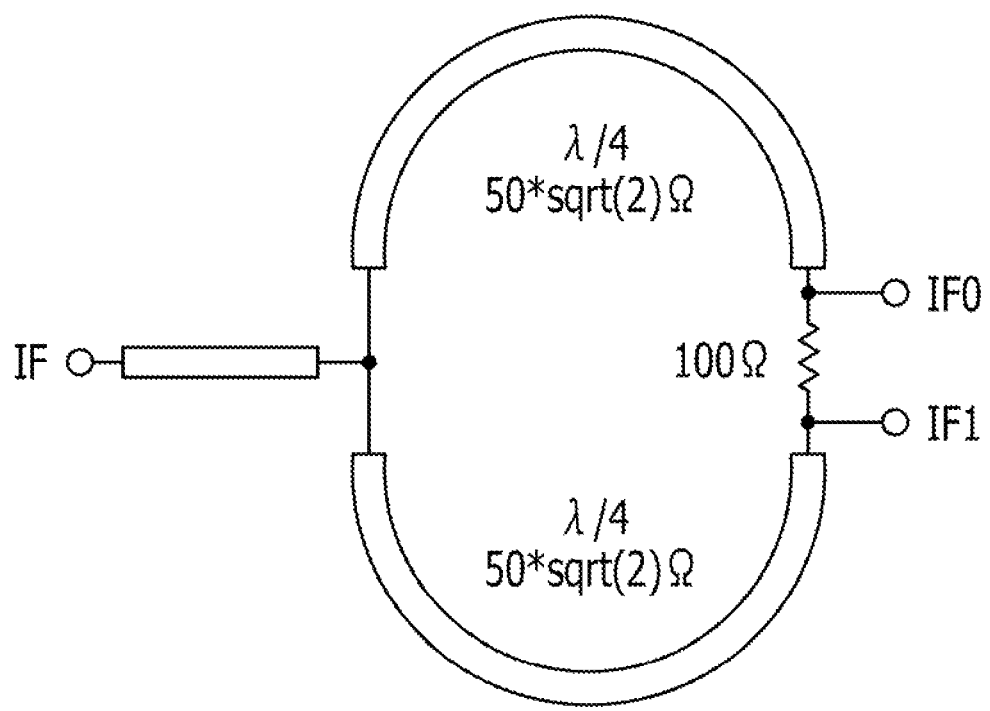
FIG. 16 is a diagram illustrating an example of the circuit of a distributor.

FIG. 16 is a diagram illustrating an exemplary circuit of a distributor 61. As shown in FIG. 16, the distributor 61 includes a 100-Ω resistor coupled to the ends of two λ/4-wavelength lines (50×2$^{1/2}$-Ω). Thus, distributed outputs are obtained from the both ends of the 100-Ω resistor.

As described above in each of the first to third embodiment, the communication device may include one oscillator as a signal source. Thus, any error due to the phase noise of the signal source can be reduced in comparison with that of the traditional communication device, thereby increasing the detection accuracy. In other words, it means that an integral action time can be shortened. Thus, an image acquisition rate can be increased. Furthermore, the numbers of oscillators and mixers can be reduced. Thus, the communication device can be reduced in size and cost.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A communication device comprising:
   an oscillator configured to generate an oscillation signal;
   a harmonic generator configured to generate a higher harmonic wave having a pulse signal from the oscillation signal;
   a first filter configured to take out a first high frequency signal from said higher harmonic wave having the pulse signal;
   a second filter configured to take out a second high frequency signal from the higher harmonic wave having the pulse signal;
   a down conversion mixer configured to use the second high frequency signal to perform down conversion of a reception signal obtained by receiving a reflected signal of the first high frequency signal being transmitted;

a hybrid coupler configured to generate a first intermediate frequency signal and a second intermediate frequency signal, which are orthogonal with each other, from the oscillation signal;

a first mixer configured to take out a first baseband signal by mixing an output from the down conversion mixer with the first intermediate frequency signal; and a second mixer configured to take out a second baseband signal by mixing an output from the down conversion mixer with the second intermediate frequency signal, wherein the harmonic generator is a pulse generator.

2. The communication device according to claim 1, wherein a center frequency of the first high frequency signal is an n-fold frequency of the oscillation signal (n is an integer), and a center frequency of the second high frequency signal is an "n+1"-fold frequency or "n−1"-fold frequency of the oscillation signal.

3. The communication device according to claim 1, wherein the harmonic generator includes:

an oscillator which outputs the oscillation signal; and a pulse generator which receives the oscillation signal and generates the pulse signal.

4. The communication device according to claim 3, wherein a pulse width generated from the pulse generator with respect to a frequency $f_{RF}$ of the first high frequency signal is $f_{RF}^{-1}$.

5. The communication device according to claim 1, wherein the harmonic generator includes a diode.

6. The communication device according to claim 1, wherein the harmonic generator includes a bipolar transistor or a field effect transistor.

7. The communication device according to claim 1, further comprising:

a sweep circuit configured to control the oscillator to sweep the frequency of the oscillation signal.

8. An imaging apparatus, comprising:

an image sensor that includes a plurality of communication devices being arranged in an array, where each of the plurality of communication devices transmits a high frequency signal to a target and each of the plurality of communication devices receives the high frequency signal reflected on the target to give a reception signal;

an A/D converter configured to convert the reception signal into a digital signal; and an image processing device configured to generate a reflected image of the high frequency signal on the target from an output from the AD converter, wherein each of the plurality of communication devices includes an oscillator configured to generate an oscillation signal, a harmonic generator configured to generate a higher harmonic wave having a pulse signal from the oscillation signal, a first filter configured to take out the high frequency signal from the higher harmonic wave having the pulse signal, a second filter configured to take out a local high frequency signal of a frequency different from the high frequency signal from the higher harmonic wave having the pulse signal, a down conversion mixer configured to use the low high frequency signal to perform down conversion of the reception signal, a hybrid coupler configured to generate a first intermediate frequency signal and a second intermediate frequency signal, which are orthogonal with each other, from the oscillation signal, a first mixer configured to take out a first baseband signal by mixing an output from the down conversion mixer with the first intermediate frequency signal, and a second mixer configured to take out a second baseband signal by mixing an output from the down conversion mixer with the second intermediate frequency signal.

9. The imaging apparatus according to claim 8, further comprising:

a sweep circuit configured to control the oscillator to sweep the frequency of the oscillation signal.

10. The imaging apparatus according to claim 8, wherein the image sensor includes a plurality of communication devices arranged in one dimension; and the imaging apparatus further includes a scanning mechanism to move the image sensor in a direction perpendicular to a direction along which the plurality of communication devices is arranged.

11. The imaging apparatus according to claim 8, wherein a center frequency of the high frequency signal is an n-fold frequency of the oscillation signal (n is an integer), and a center frequency of the local high frequency signal of a frequency different from the frequency of the high frequency signal is an "n+1"-fold frequency or "n−1"-fold frequency of the oscillation signal.

12. The imaging apparatus according to claim 8, wherein the harmonic generator includes:

an oscillator which outputs the oscillation signal; and a pulse generator which receives the oscillation signal and generates the pulse signal.

13. The imaging apparatus according to claim 12, wherein a pulse width generated from the pulse generator with respect to a frequency $f_{RF}$ of the high frequency signal is $f_{RF}^{-1}$.

14. The imaging apparatus according to claim 8, wherein the harmonic generator includes a diode.

15. The imaging apparatus according to claim 8, wherein the harmonic generator includes a bipolar transistor or a field effect transistor.

* * * * *